US005596476A

United States Patent [19]

Kirch et al.

[11] Patent Number: 5,596,476

[45] Date of Patent: Jan. 21, 1997

[54] SURGE ARRESTER WITH A MTAL OXIDE RESISTOR

[75] Inventors: Johannes Kirch; Hans Leuschner, both of Berlin, Germany

[73] Assignee: Siemens Aktiengesellschaft, Munich, Germany

[21] Appl. No.: 446,698

[22] PCT Filed: Dec. 2, 1993

[86] PCT No.: PCT/DE93/01159

§ 371 Date: Aug. 14, 1995

§ 102(e) Date: Aug. 14, 1995

[87] PCT Pub. No.: WO94/14171

PCT Pub. Date: Jun. 23, 1994

[30] Foreign Application Priority Data

Dec. 8, 1992 [DE] Germany .............................. 9217133 U

[51] Int. Cl.[6] .............................. H02H 1/04

[52] U.S. Cl. .............................. 361/127; 361/117; 338/21; 338/235

[58] Field of Search .............................. 338/20–21, 235; 361/117–130

[56] References Cited

U.S. PATENT DOCUMENTS

| | | | |
|---|---|---|---|
| 4,326,232 | 4/1982 | Nishiwaki et al. | 361/127 |
| 4,812,944 | 3/1989 | Eberhard et al. | 361/127 |
| 4,814,936 | 3/1989 | Ozawa et al. | 361/127 |
| 5,113,306 | 5/1992 | Veverka et al. | 361/127 |
| 5,359,316 | 10/1994 | Ozawa et al. | 338/21 |

OTHER PUBLICATIONS

IEEE Transactions On Power Delivery, vol. PWRD–1, No. 1, Jan. 1986, pp. 151–156, J. Ozawa et al.: *Pressure Relief Design and Performance of Metal Oxide Surge Arresters.*

*Primary Examiner*—Jeffrey A. Gaffin
*Assistant Examiner*—Michael J. Sherry
*Attorney, Agent, or Firm*—Kenyon & Kenyon

[57] ABSTRACT

In a surge arrester with a multi-column arrangement of the metal oxide resistors within an insulating housing, each column is to be made of resistance elements in a mechanically self-supporting structure. To this end, the resistance elements of each column are arranged between two holding plates intercon-nected by holding rods. The individual columns, called "modules", are arranged to be individually centered on a plate fitted at the lower end of the insulating housing.

3 Claims, 1 Drawing Sheet

SURGE ARRESTER WITH A MTAL OXIDE RESISTOR

BACKGROUND OF THE INVENTION

The invention, which is in the area of protective engineering for energy distribution facilities, is concerned with the structural configuration of a surge arrester, with an insulating housing and with a metal oxide resistance arranged inside the insulating housing, such that the metal oxide resistor consists of two or more columns, connected electrically in parallel, made up of a larger number of resistance elements, of which each column has two separate holding plates between which the resistance elements of the column are arranged, and which in turn are joined by means of insulating holding rods which laterally immobilize the resistance elements.

Surge arresters with a metal oxide resistor as the shunting element generally consist of a plurality of flat cylindrical resistance elements arranged in columnar fashion one above the other, the column formed by these resistance elements being arranged inside a ceramic or plastic insulator tightly sealed at the top and bottom ("IEEE Transactions on Power Delivery," Volume PWRD-1, No. 1, January 1986, pp. 151–156; FIG. 6).

To increase the energy handling capacity or to reduce the residual voltage, it is common in the case of metal oxide shunts to connect a plurality of resistance columns made up of individual resistance elements in electrically parallel fashion. For this purpose, two to four columns are arranged next to one another, inside a common insulating housing, on a support plate by means of which they are inserted into the common housing. This is known, for example, from U.S. Pat. No. 4,326,232.

SUMMARY OF THE INVENTION

The invention creates a surge arrester structure which improves the individual columns in terms of handling and accessibility for measurement purposes. Proceeding from a surge arrester with the features of the preamble of claim 1, the columns are arranged at the lower end of the insulating housing on a plate, centered with respect to the axis of the insulating housing, and a separate compression spring is associated with each of the columns for contact purposes.

A configuration of this kind thus provides for each individual column, made up of resistance elements, to constitute an independent module which represents a mechanically self-supporting structure. The particular required number of these modules is placed next to one another in the insulating housing, and mechanically and electrically joined together and immobilized at both ends by suitable structural means. The assembly of multiple modules, standardized in this fashion and completely identical to one another, yields a substantial simplification in production. In particular, the individual modules are easy to handle during assembly of the surge arrester. Furthermore, it is possible to evaluate the individual modules before complete assembly of the surge arrester, and thus determine current distribution. With reference to the operation of this kind of surge arrester, separate construction of the individual resistance columns allows displacement of the modules with respect to one another when the suppressor is overloaded, thus opening up a pressure relief channel of the greatest possible cross section in the region of the active arc. This displaceability can be ensured by suitable structural measures at the top end—and, if necessary, also at the bottom end—of the individual columns.

Because contact with each individual resistance column is made by a separate compression spring, a contact pressure of substantially equal magnitude, and thus a transition resistance of equal magnitude, is achieved for all the modules.

BRIEF DESCRIPTION OF THE DRAWINGS

An exemplary embodiment of the invention is depicted in FIGS. 1 and 2, in which.

DETAILED DESCRIPTION

Figure 1:
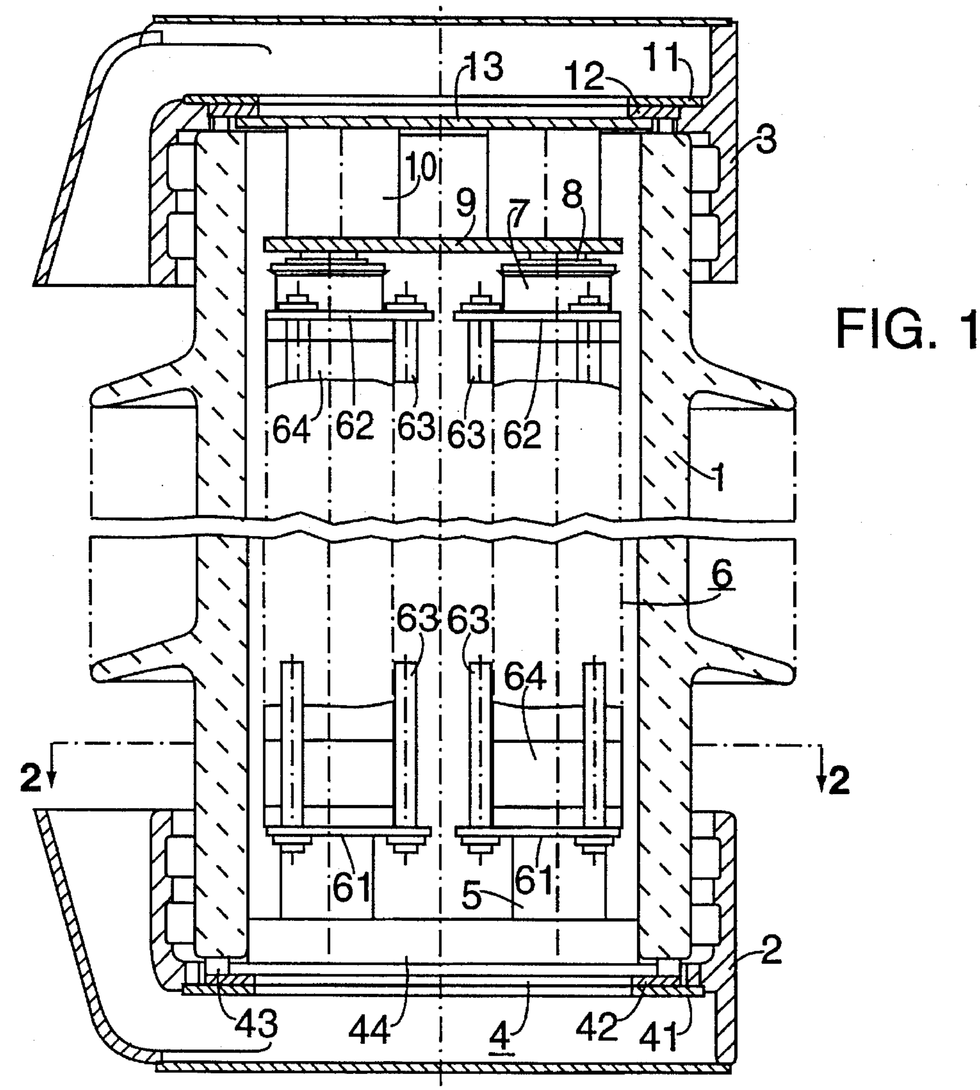
FIG. 1 shows a vertical section of the housing with a view of the suppressor element.

FIG. 1 shows an surge arrester whose housing consists, in a known manner, of ceramic insulator 1 and a metal foot part 2 and a metal head part 3. The housing could also be made of a plastic. Arranged at the lower end of ceramic insulator 1 is a plate 4 in the form of a bearing bracket, which is immobilized by means of a mounting ring 41, such that this mounting ring also immobilizes a membrane 42 and a sealing ring 43. Also joined to plate 4 is a superposed cruciform web member 44, on which the columnar resistance modules 6 are braced. These modules consist of a plurality of resistance elements 64, arranged one on top of another, which are located between the lower holding plate 61 and upper holding plate 62, the holding plates being joined together by means of three holding rods 63 arranged with uniform spacing at the circumference. Fastened in each case to the lower holding plate 61 is a block-like spacer 5, by means of which the respective columnar module 6 is positively centered in the cruciform web member 44.

Also arranged on the upper holding plate 62 is a spacer 7 on which a compression spring 8 rests. Also provided, in shared fashion for all columnar modules 6, is a contact plate 9 which is placed under pressure, with the interposition of pressure pieces 10, by pressure ring 11 joined to head part 3, and by pressure plate 13. Pressure plate 13 further serves to immobilize the upper membrane 12 and associated sealing ring.

Figure 2:
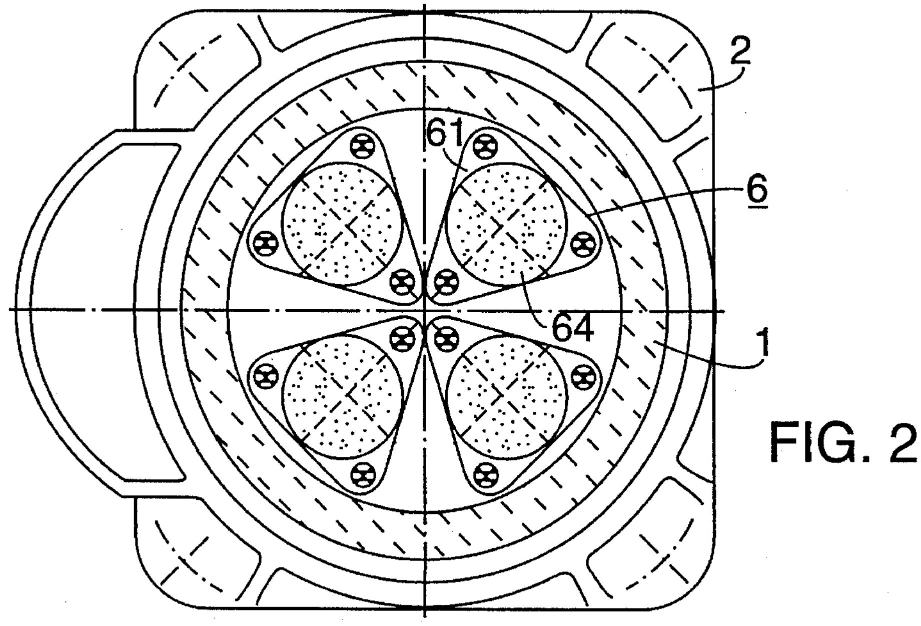
FIG. 2 shows a cross section through the suppressor in the region of the lower end.

According to FIG. 2, four columnar modules 6 are arranged inside ceramic insulator 1. Holding plates 61 and 62 of the modules are triangular in shape, in order to ensure the least possible radial expansion of the surge arrester as a whole.

We claim:

1. A surge arrester with an insulating housing having a metal oxide resistor arranged inside the insulating housing, such that the metal oxide resistor consists of two or more electrically parallel connected columns, which are made up of a larger number of resistance elements, of which each column has two separate holding plates between which the resistance elements of the column are arranged, and which in turn are joined by means of insulating holding rods which laterally immobilize the resistance elements, wherein the columns are arranged on a plate at the lower end of the insulating housing, and centered with respect to the axis of the insulating housing, wherein a separate compression spring is associated with each of the columns for contact purposes.

2. The surge arrester according to claim 1, wherein the holding plates are triangular in shape.

3. The surge arrester according to claim 1, wherein each column is independently positioned in the insulating housing.

* * * * *